United States Patent Office 3,098,776
Patented July 23, 1963

3,098,776
METHODS OF HEAT-TREATING LOW CARBON STEEL
Paul F. Elarde, Naperville, Ill., assignor to Western Electric Company, Incorporated, a corporation of New York
No Drawing. Filed Dec. 9, 1960, Ser. No. 74,759
3 Claims. (Cl. 148—122)

The present invention relates generally to methods of heat-treating low carbon steel, and more particularly to methods of increasing the magnetic permeability of such steel by a controlled heat treatment.

In the past, it has not been considered practical to fabricate the working parts of electromagnetic devices, such as relay armatures and cores, from ordinary commercial low carbon steel, such as SAE 1010 steel. Although this material is relatively inexpensive and is available in great quantity from diverse sources, it has been used mainly for structural purposes in the past and has been considered unsuitable for the more critical electromagnetic applications primarily because of the relatively low magnetic permeability of such material in ordinary form. For such electromagnetic applications special materials have been utilized, particularly a very pure form of iron known as "magnetic iron," which materials are generally much more expensive and less readily available than the ordinary low carbon steel of commerce. In addition, magnetic iron is subject to the phenomenon of aging, whereby the magnetic properties deteriorate over a substantial period of time.

Accordingly, the primary object of the invention is to provide new and improved methods of heat treating low carbon steel so as to increase the magnetic permeability thereof.

Another object of the invention is to increase the permeability of commercial low carbon steel to such a degree as to render this material suitable for the more critical electromagnetic applications.

Another object of the invention is to provide a low carbon steel having a high permeability and not subject to magnetic aging to any substantial degree.

With the foregoing and other objects in view, a method in accordance with certain features of the invention consists of the steps of heating a low-carbon steel at a temperature between about 1450 and 1600° F. in a wet reducing atmosphere, cooling the steel at an initial rate between about 100 and 250° F. per hour in a reducing atmosphere to a temperature between about 900 and 1250° F., and then cooling the steel further at an increased rate of at least 400° F. per hour in a reducing atmosphere.

More specifically, it is preferred to heat treat the steel at a temperature of approximately 1525° F. in a wet forming gas atmosphere for about 5 hours, to cool at an initial rate of about 200° F. per hour to a temperature of approximately 1000° F. in a dry forming gas atmosphere, and then to cool further at a rate of approximately 500° F. per hour to a temperature at least as low as 200° F. in a dry forming gas atmosphere, whereafter the treatment is not critical and the steel may simply be allowed to cool down to room temperature in air.

Other objects, advantages and aspects of the invention will appear from the following detailed description of a specific example thereof, when taken in conjunction with the accompanying discussion relative to permissible variations in process conditions.

According to one specific, preferred example of the invention, a batch of relay cores fabricated of a commercial SAE 1010 cold rolled steel was placed in a cold electric furnace. The temperature of the furnace was then brought up to an operating temperature of approximately 1525° F. over a period of about two hours, although the heating rate is not considered critical. During the heat-up period, a reducing atmosphere was utilized, specifically an atmosphere of dry forming gas. "Forming gas" is a nonexplosive mixture of nitrogen and hydrogen, which is commonly used for heat-treating atmospheres and contains approximately 3 to 20% by weight hydrogen with the balance substantially pure nitrogen.

In the specific example, a forming gas containing approximately 5% by weight of hydrogen was utilized and this formulation is preferred for most applications, although the percentage of hydrogen within the 3 to 20% limits is not particularly critical. At all times it is desired to exclude oxygen or any other oxidizing substance and, during the heat-up period or at least the initial portion thereof, it is preferred to exclude water vapor as well.

After the operating temperature of 1525° F. was reached, the atmosphere was changed from dry forming gas to "wet" forming gas. "Wet" forming gas is forming gas which contains an appreciable quantity of water vapor, specifically forming gas which is substantially saturated at room temperature with water vapor. The wet forming gas is produced, simply, by bubbling dry forming gas through a water bath, and then passing the water-vapor containing gas to the furnace. The steel was maintained in the wet forming gas atmosphere at a temperature of 1525° F. for a period of approximately five hours, after which the cooling cycle was initiated.

At or shortly after the start of the cooling cycle, the atmosphere was changed from wet forming gas to dry forming gas. During a first discrete stage of the cooling process, the articles were cooled at a relatively slow rate of approximately 200° F. per hour from the operating temperature of 1525° F. to an intermediate temperature of approximately 1000° F., after which the second stage of cooling was initiated.

For the second cooling stage, the cooling rate was increased markedly to a rate of approximately 500° F. per hour. The articles were cooled at this increased rate from the intermediate temperature of 1000° F. down to a temperature of about 200° F. in a dry forming gas atmosphere. After the temperature had reached the relatively low value of 200° F., the articles were removed from the furnace and were allowed to cool more rapidly, down to room temperature, in air.

Using former heat treatments, an assortment of different low carbon steels exhibited average maximum permeability values of the order of 2000, while parts treated in accordance with the present invention exhibited maximum permeability values between about 6000 and 10,000. These latter values meet manufacturing specifications for substantially all electromagnetic applications formerly requiring magnetic iron or the equivalent. While the magnetic permeability is the paramount factor under consideration, the heat-treated cores were likewise satisfactory in every other respect so as to enable substitution of this material for magnetic iron. Specifically, the treated cores exhibited substantially no magnetic aging, which rendered them markedly superior to magnetic iron in this respect.

While the subject process is particularly applied to such common low-carbon steels as SAE 1010 or AISI C–1010, which have a nominal carbon percentage of 0.10% and are widely available and relatively inexpensive, the process is also applicable to a wide variety of other low-carbon steels. Specifically, low-carbon steels refer to those containing between about 0.04 and 0.20% carbon, and with elements other than iron totaling not more than about 0.60%.

Various modifications may be made from the specific process conditions described in conjunction with the foregoing specific embodiment of the process. Specifically, the atmosphere during the heating portion of the cycle must be reducing in nature and must contain an appreciable quantity of water vapor, which is referred to as a "wet" reducing atmosphere. While it is preferred in practice to utilize a wet forming gas atmosphere as described, other wet reducing atmospheres containing hydrogen or other reducing agents may be utilized. While greater or lesser quantities of water vapor may be used in the gas, it has been found effective and is highly expedient simply to bubble the gas at room temperature through a water bath and thus to utilize the relatively small amount of water vapor represented by saturation of the gas at room temperature.

As to the temperature of heating, a range of about 1450 to 1600° F. may be utilized for a wide range of low-carbon steels, with a temperature of about 1500 to 1550° F. being preferred for most applications.

The time of heat treatment should be held between about 3 to 6 hours, with the shorter times corresponding to the lower percentages of carbon in the steel. Best results are achieved for a wide variety of low-carbon steels when the time is maintained at about 5 hours.

It is highly preferred that the cooling be conducted in two discrete stages, the second being at a substantially faster rate than the first. While a rate of 200° F. per hour is preferred for the first stage, this rate may be varied as a practical matter between about 100 and 250° F. per hour, and it is very important not to exceed the maximum rate of about 250° F. per hour during the first portion of the cooling cycle because the final permeability drops off substantially in that case. While the intermediate temperature between the first and second stages of cooling is preferably 1000° F., this temperature may be varied in practice between about 900° F. and about 1250° F.

The cooling rate in the second stage is not too critical, but should be at a rate substantially faster than in the first stage and at least 400° F. per hour, preferably between about 400 and 600° F. per hour.

As to the atmosphere during the cooling cycle, it must be a reducing atmosphere and preferably is forming gas as used in the heating cycle, but without the water vapor. Wet forming gas may be used during the cooling cycle and the final permeability is substantially unaffected; however, the articles thus cooled are not bright in appearance and are rather bluish in color, apparently because of surface oxidation due to the presence of the water vapor at the relatively lower temperatures. Since it is generally required to clean such parts by a dip in inorganic acids, it is preferred to cool in the absence of the water vapor so as to dispense with the cleaning step.

While various specific examples and embodiments of the invention have been described in detail hereinabove, it will be obvious that various modifications may be made from the specific details described without departing from the spirit and scope of the invention.

What is claimed is:

1. The method of increasing the magnetic permeability of ordinary commercial SAE 1010 low-carbon steel from a maximum permeability value of the order of 2000 to a maximum permeability value between about 6000 and 10,000, which consists in heating the steel at a temperature between about 1500 and 1550° F. in a wet forming gas atmosphere for a period of about 3 to 6 hours, cooling the steel at an initial rate of approximately 200° F. per hour to a transition temperature of approximately 1000° F. in a dry forming gas atmosphere, and then cooling the steel further at an increased rate of approximately 400 to 600° F. per hour to a temperature at least as low as 200° F. in a dry forming gas atmosphere, after which the cooling conditions are substantially immaterial.

2. The method of increasing the magnetic permeability of ordinary commercial SAE 1010 low-carbon steel from a maximum permeability value of the order of 2000 to a maximum permeability value between about 6000 and 10,000, which consists in heating the steel at a temperature of approximately 1525° F. in a wet forming gas atmosphere for a period of approximately 5 hours, cooling the steel at an initial rate of approximately 200° F. per hour to a transition temperature of approximately 1000° F. in a dry forming gas atmosphere, and then cooling the steel further at an increased rate of approximately 500° F. per hour to a temperature at least as low as 200° F. in a dry forming gas atmosphere, after which the cooling conditions are substantially immaterial.

3. The method of increasing the magnetic permeability of ordinary commercial SAE 1010 low carbon steel from a maximum permeability value of the order of 2000 to a maximum permeability value between about 6000 and 10,000, which consists in heating the steel at a temperature between about 1450 and 1600° F. in a wet reducing atmosphere for a period of about 3 to 6 hours, cooling the steel at an initial rate between about 100 to 250° F. per hour in a dry reducing atmosphere to a transition temperature between about 900 and 1250° F., and then cooling the steel further at an increased rate of approximately 400 to 600° F. per hour to a temperature at least as low as 200° F. in a dry reducing atmosphere, after which the cooling conditions are substantially immaterial.

References Cited in the file of this patent

UNITED STATES PATENTS

| | | |
|---|---|---|
| 1,964,475 | Morrill | June 26, 1934 |
| 2,209,687 | Crafts | July 30, 1940 |
| 2,287,467 | Carpenter | June 23, 1942 |

OTHER REFERENCES

Metallurgical Dictionary, Henderson, Reinhold Publishing Corporation, New York 36, New York, 1953, pp. 57–58.